W. A. LINDSAY.
PARING AND CUTTING KNIFE.
APPLICATION FILED JULY 31, 1907.
919,735.
Patented Apr. 27, 1909.
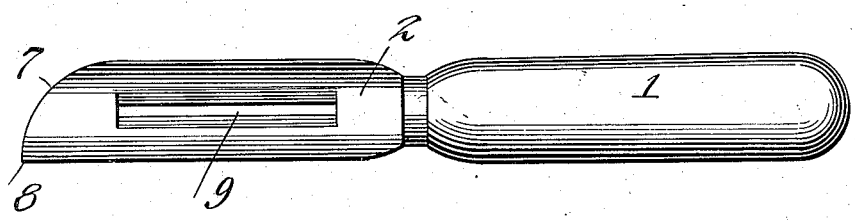
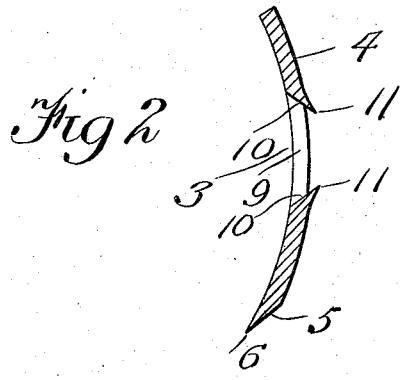
Witnesses
Hugh H. Ott
K. Allen.
Inventor
William A. Lindsay
By Victor J. Evans
Attorney

UNITED STATES PATENT OFFICE.

WILLIAM A. LINDSAY, OF ANDERSON, INDIANA.

PARING AND CUTTING KNIFE.

No. 919,735.  Specification of Letters Patent.  Patented April 27, 1909.

Application filed July 31, 1907. Serial No. 386,398.

*To all whom it may concern:*

Be it known that I, WILLIAM A. LINDSAY, a citizen of the United States, residing at Anderson, in the county of Madison and State of Indiana, have invented new and useful Improvements in Paring and Cutting Knives, of which the following is a specification.

This invention is an improved paring and cutting knife especially adapted for paring fruits and vegetables and for also cutting the same into thin slices or chips, as hereinafter described and claimed.

In the accompanying drawings, Figure 1 is an elevation of a paring and cutting knife constructed in accordance with this invention. Fig. 2 is a transverse sectional view on a larger scale on a plane intersecting the blade.

The handle 1 of the knife may be of the form here shown or of any other suitable form. The same is provided at one end with a blade 2 which presents a transversely concave front or inner surface 3 and a convex rear or outer surface 4. One edge of the said blade is beveled on the rear side, as at 5, to form a cutting edge 6. The outer end of the said blade is rounded as at 7 to form a cutting point 8 at the outer corner of the blade at the cutting edge 6 thereof, the said cutting point being especially adapted for use in cutting out eyes or pits of fruits and vegetables. The said blade is provided with a longitudinal-slot 9, the rear side of which is narrower than the front side thereof to present edges 10, which converge toward the concave, front side of the blade and form cutting edges 11 on the back or convex side of the blade at the sides of such slot.

By holding the fruit or vegetable in one hand and with the other hand manipulating the knife so as to present the concaved side of the blade to the surface of such fruit or vegetable and moving the knife on the fruit or vegetable first in one direction and then in the other direction transversely with reference to the blade, the edges 6, 11 of the blade will operate to peel the fruit or vegetable, as will be understood. After the peeling has been cut off a continuance of such manipulation will cause the fruit or vegetable to be cut into thin slices or chips. The cutting edges 6 may be used for cutting the fruit or vegetable in pieces. The cutting point 8 is useful in cutting out the core, as well as in cutting out the eyes or pits.

Having thus described the invention, what I claim as new and desire to secure by Letters Patent is:—

A knife of the class described having a blade concave on one side and convex on the other, such blade rounded at its outer end on one side and presenting two parallel straight edges of unequal length, the longer straight edge being beveled to form a cutting edge at the concave side of the blade and extending to such rounded end to form a cutting point and a cutting edge, such blade being further provided with a longitudinal slot having beveled sides converging toward the convex surface of the blade and forming cutting edges at such convex surface.

In testimony whereof, I affix my signature in presence of two witnesses.

WILLIAM A. LINDSAY.

Witnesses:
  JULIA A. MOORE,
  D. C. CHIPMAN.